Patented May 11, 1954

2,678,295

UNITED STATES PATENT OFFICE 2,678,295

COMPOSITION FOR CONTROL OF POULTRY DISEASES

Theodore N. Goreau, Chadds Ford, Pa., and Otto Neracher, Wilmington, Del., assignors to Hercules Powder Company, Wilmington, Del., a corporation of Delaware No Drawing. Application September 30, 1952, Serial No. 312,406

6 Claims. (Cl. 167—53.1)

This invention relates to the preparation of 3,5-dialkoxybenzaldehyde thiosemicarbazones, new compounds having an outstanding activity against Newcastle virus, a pathogenic microorganism causing a severe poultry disease, and to compositions thereof for the control of poultry diseases.

Two diseases which confront poultry growers because of the high mortality rate of these diseases are Newcastle disease and coccidiosis, the first being caused by a virus and the second being a protozoan infection. Various drugs have been proposed for the control of coccidiosis but the only control available for Newcastle disease has been by vaccination. The latter is, of course, a costly and time-consuming operation and even then is not entirely satisfactory for the control of this very serious poultry disease.

Now, in accordance with this invention, new compounds have been prepared, namely, ethers of 3,5-dihydroxybenzaldehyde thiosemicarbazone, which compounds are unique in their high activity against the virus that causes Newcastle disease in poultry. They also have a high activity against cecal coccidiosis in chickens (a protozoan disease) and other protozoan infections. The new compounds of this invention may be defined as ethers of 3,5-dihydroxybenzaldehyde thiosemicarbazone having the formula

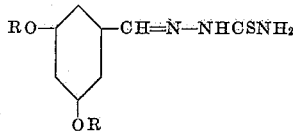

where each R is an alkyl or alkenyl group and contains a maximum of 5 carbon atoms, as, for example, methyl, ethyl, propyl, isopropyl, butyl, isobutyl, sec-butyl, tert-butyl, amyl, isoamyl, allyl, and methallyl groups. Exemplary of these new products are 3,5-dimethoxybenzaldehyde thiosemicarbazone, 3,5-diethoxybenzaldehyde thiosemicarbazone, 3,5-di-tert-butoxybenzaldehyde thiosemicarbazone, 3,5-diallyloxybenzaldehyde thiosemicarbazone, etc.

The following example will illustrate the preparation of these new compounds.

Example 1

To a refluxing solution of 166 parts of 3,5-dimethoxybenzaldehyde in 500 parts of ethanol was added a solution of 91 parts of thiosemicarbazide in 1000 parts of hot water, the mixture being agitated vigorously during the addition. As the thiosemicarbazide solution was added, the precipitation of the product began and additional water was added to thin the thick mass toward the end of the addition. After completion of the reaction, the slurry was cooled in ice water and filtered. The precipitate was then washed with water and dried, whereby 236 parts of the 3,5-dimethoxybenzaldehyde thiosemicarbazone having a melting point of 210° C. was obtained. On recrystallization from 80% ethanol, the product was found to have a constant melting point of 211°–212° C. It is slightly soluble in warm alcohol and acetone, nearly insoluble in benzene and toluene, and completely insoluble in water.

The foregoing example has illustrated the preparation of 3,5-dimethoxybenzaldehyde thiosemicarbazone from the aldehyde and thiosemicarbazide. The other 3,5-dialkoxy- or dialkenoxybenzaldehyde thiosemicarbazones may be prepared in the same way or any other method of preparing a thiosemicarbazone from an aldehyde may be applied to the preparation of these products. For example, instead of using thiosemicarbazide for the reaction, the aldehyde may be reacted with ammonium thiocyanate and hydrazine hydrate in one step. The thiosemicarbazone may also be prepared by reacting the aldehyde with the salt formed from hydrazine and thiocyanic acid. Instead of using the aldehyde as the intermediate for the preparation of the thiosemicarbazone, a derivative of the 3,5-dialk(or alken)oxybenzaldehyde may be used; as, for example, the oxime, semicarbazone, acid, hydrazone, azines, or imides may be reacted with thiosemicarbazide in acid medium.

The following examples will illustrate the efficacy of the 3,5-dialkoxybenzaldehyde thiosemicarbazones against the virus causing Newcastle disease and against protozoan infections.

Example 2

The high activity of 3,5-dimethoxybenzaldehyde thiosemicarbazone against Newcastle virus was shown by tests made on chicken embryos. The virus used was that known as the Brandly strain, which belongs to the so-called American group of Newcastle disease viruses. This virus was known to cause disease in chickens and to have a very high titer (potency) in developing chicken embryos when inoculated into the allantoic cavity, being capable of killing chicken embryos in 2 to 4 days when used in proper dilutions.

Nine-day-old fertile eggs were used in groups of 12 per dilution of the compound and per dilution of the virus. A series of 12 uninoculated eggs was included as a fertility control and a series of 12 eggs was inoculated with the solvent (ethanol) used in making the dilutions. The eggs were kept in the incubator at 37° C. for 7 days, being tested every day. The eggs were candled and the deaths and survivals recorded daily. After 7 days all of the eggs were tested, using the Hirst hemagglutination test, for the presence of the Newcastle virus. By this means it was determined that 3,5-dimethoxybenzaldehyde thiosemicarbazone was effective against the virus that causes Newcastle disease, a dilution of 10 micrograms per cubic centimeter completely neutralizing a dose of 100,000 MLD (minimum lethal dose) of virus.

*Example 3*

In these experiments 3,5-dimethoxybenzaldehyde thiosemicarbazone was tested as both a prophylactic and therapeutic agent against Newcastle disease in chicken flocks. Two strains of Newcastle virus were used, on being an English strain which has a mortality of 30–32% and the other being a Brandly strain which has mortality of 80–90%. Each strain was used in both a prophylactic test and a therapeutic test. The chickens were inoculated intranasally with 1000 times the minimal dose causing disease in 30–32% or 80–90%, respectively, Hungarian chickens being used in the tests made with the English strain and mixed White Leghorn and Rhode Island chickens being used in the tests made with the Brandly strain. The 3,5-dimethoxybenzaldehyde thiosemicarbazone was fed to the chickens by dispersing a 1% ethanol solution of it in the drinking water. In the prophylactic test, one-half of the chickens were given the drug in the drinking water for 3 days prior to the intranasal inoculation and for 1 day afterwards, the other half of the chickens receiving none of the drug in their drinking water. In the therapeutic test the feeding of the drug was begun only after clinical symptoms appeared. The following table sets forth the per cent of chickens that survived in each test with each of the viruses, the dose being the grams of the drug per kilogram of body weight of the chickens.

| Newcastle Virus | Prophylactic | | Therapeutic | |
|---|---|---|---|---|
| | Dose, g./kg. | Survival Rate, percent | Dose, g./kg. | Survival Rate, percent |
| English strain | 0.1 | 96.7 | 0.1 | 78.3 |
| | | | 0.05 | 30.4 |
| | untreated | 64.2 | untreated | 8.6 |
| Brandly strain | 0.1 | 100 | 0.1 | 73.1 |
| | 0.03 | 95 | 0.05 | 65.4 |
| | untreated | 30 | untreated | 7.7 |

Thus, 3,5-dimethoxybenzaldehyde thiosemicarbazone may be seen to be an excellent drug for curing Newcastle disease in chickens. Even more important is the fact that it gives almost 100% protection when used as a preventative even though the dose was 1000 times greater than that required to cause the disease in 30–32% and 80–90% of the chickens with the English strain and the Brandly strain of virus, respectively.

*Example 4*

3,5-dimethoxybenzaldehyde thiosemicarbazone is also effective in the control of coccidiosis in chickens. In this test the drug was used in a dosage of 0.1 g./kg./day for 4 days (given in the drinking water as in Example 3), the first day of treatment being the day before exposure to the disease. Of the treated birds only 10% became infected as against 85% infected in the control where the birds received no treatment and 25% infected where the birds were treated with sulfaquinoxaline, a drug used as a standard for the control of this disease.

*Example 5*

3,5-dimethoxybenzaldehyde thiosemicarbazone has also been found to be effective in the treatment of amebiosis in dogs, a protozoan disease caused by *E. histolytica*. The compound was found to completely inhibit the protozoa in vitro at a concentration of 10 micrograms per cubic centimeter and to give partial inhibition at a concentration of 0.5 microgram per cubic centimeter. A test in vivo was made on two dogs that were suffering from amebiosis. When given a dose of 0.1 g./kg./day (the 3,5-dimethoxybenzaldehyde thiosemicarbazone being mixed in with the dog food), they were completely cured in 3 days.

*Example 6*

When tested in vitro against the protozoa *Trichomonas vaginalis*, 3,5-dimethoxybenzaldehyde thiosemicarbazone was found to completely inhibit the protozoa at a concentration of 15 micrograms per cubic centimeter and to give partial inhibition at a concentration of 0.25 microgram per cubic centimeter.

The toxicity of 3,5-dimethoxybenzaldehyde thiosemicarbazone was determined in a test made on mice. Groups of 8 mice were fed the drug over a period of 3 weeks at the rate of 0.1, 0.05, 0.025 and 0.01 g./kg./day. The treatment revealed no toxic symptoms at any of these levels and the drug was found to be well-tolerated, in general. It was not toxic to four-week-old chickens when given by mouth as much as 0.5 g./kg.

The foregoing examples have demonstrated the control of such poultry diseases as Newcastle disease and cecal coccidiosis by incorporating a 3,5-dialkoxybenzaldehyde thiosemicarbazone in the drinking water fed to the chickens. However, it is readily given to the chickens by incorporating it in any other type of chicken feed. This is particularly true when it is being given as a prophylactic drug. However, when used as a therapeutic agent, the drug is preferably incorporated in the drinking water so as to assure that the chickens will receive an adequate amount of the drug. The reason for this is that a chicken may stop eating when it is sick but it will usually continue to drink water and, hence, will then receive the necessary drug to cure the disease. Any convenient way of preparing the chicken feed containing these ethers of 3,5-dihydroxybenzaldehyde thiosemicarbazone may be used. For example, they may be dissolved in a nontoxic amount of a solvent such as alcohol and the solution then dispersed in the drinking water or the chicken mash, or the drug may be diluted with a nontoxic inert material and then mixed in with the dry food. The concentration to be fed to the chickens will, of course, depend on whether it is being used as a prophylactic or therapeutic agent or as a growth-promoting agent. In the latter case, a concentration of from about 10 to 50 grams per ton (0.001 to 0.005%) of feed will be adequate, but when used for prophylaxis or as a curative, greater concentrations are used, as, for example, from about 1 to 4 lb. per ton of feed (0.05 to 0.2%), preferably at least about 2 lb. per ton. Thus, the animal ration will contain, in general, from about 0.001% to about 0.2%. Greater amounts may be used but generally are not required.

What we claim and desire to protect by Letters Patent is:

1. As new compositions of matter, thiosemicarbazones having the formula

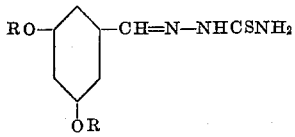

where each R is one of the group consisting of alkyl and alkenyl groups which contain a maximum of 5 carbon atoms.

2. As a new composition of matter, a 3,5-dialkoxybenzaldehyde thiosemicarbazone wherein the alkyl groups contain from 1 to 5 carbon atoms.

3. As a new composition of matter, 3,5-dimethoxybenzaldehyde thiosemicarbazone.

4. A composition for the control of poultry diseases comprising a poultry feed containing a thiosemicarbazone having the formula

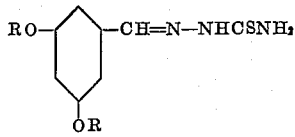

where each R is one of the group consisting of alkyl and alkenyl groups which contain a maximum of 5 carbon atoms.

5. A composition for the control of poultry diseases comprising a poultry feed containing a 3,5 - dialkoxybenzaldehyde thiosemicarbazone wherein the alkyl groups contain from 1 to 5 carbon atoms.

6. A composition for the control of poultry diseases comprising a poultry feed containing 3.5-dimethoxybenzaldehyde thiosemicarbazone.

References Cited in the file of this patent

FOREIGN PATENTS

| Number | Country | Date |
|---|---|---|
| 989,828 | France | May 30, 1951 |

OTHER REFERENCES

Hoggarth: "Brit. J. Pharmacol." vol. 4 (1949), p. 249.

Donovick et al.: "J. Bacteriology," vol. 59 (1950), p. 670.

Hamre: "J. Bacteriology," vol. 59 (1950), p. 676.

Bernstein et al.: "J. Am. Chem. Soc.," vol. 73, March 1951, p. 907.

Sah et al.: "Rec. Trav. Chim.," vol. 69 (1950), p. 1549.